March 16, 1965     D. J. NEALE, SR     3,173,638
LASHED CABLE SUPPORT
Filed July 1, 1963
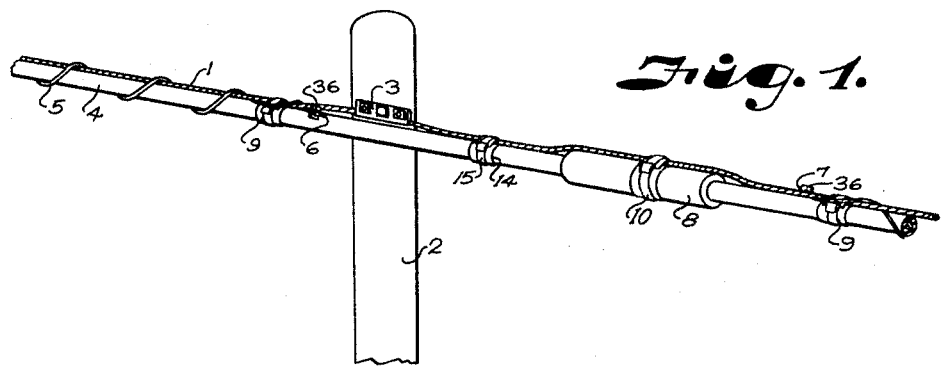
Fig. 1.
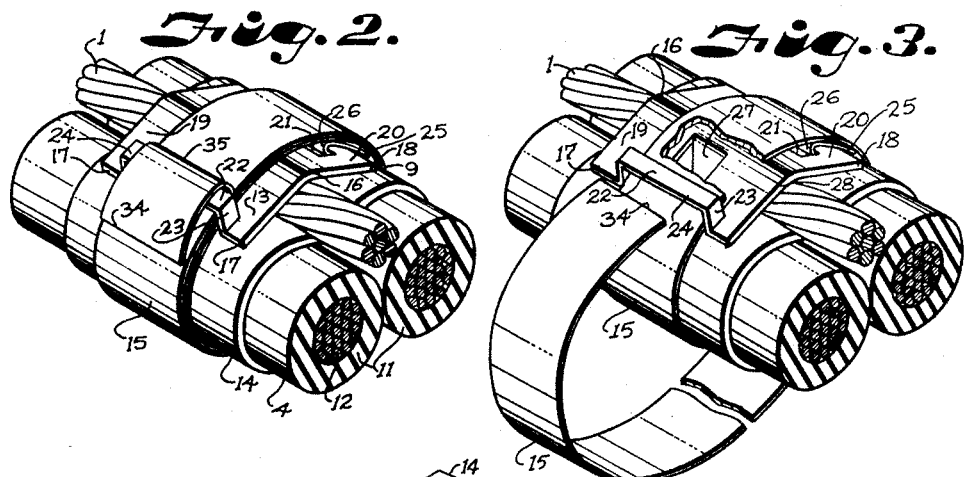
Fig. 2.     Fig. 3.
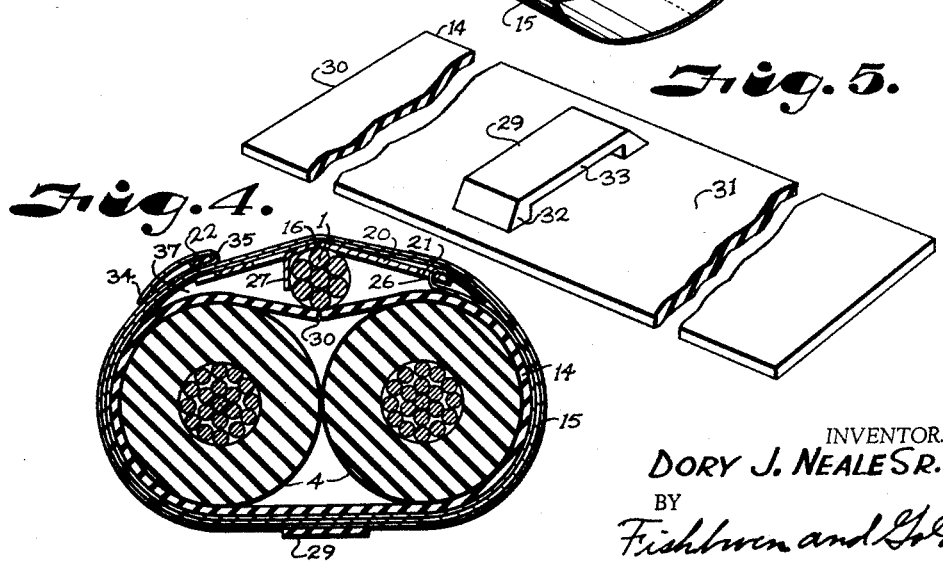
Fig. 5.
Fig. 4.
INVENTOR.
DORY J. NEALE SR.
BY
Fishburn and Gold
ATTORNEYS

United States Patent Office 3,173,638
Patented Mar. 16, 1965

3,173,638
LASHED CABLE SUPPORT
Dory J. Neale, Sr., 3710 Shore Acres Blvd.,
St. Petersburg, Fla.
Filed July 1, 1963, Ser. No. 291,823
8 Claims. (Cl. 248—61)

This invention relates to aerial cable supports, and more particularly to a structure for placement at selected positions about a cable and its supporting strand or messenger to hold or bind the cable thereto.

It is common practice in installation of aerial cables to string a messenger or supporting strand between supports such as poles and then to attach an aerial cable near a support and lift the cable whereby it extends along the supporting strand and then lash the cable to the strand by spinning a lashing wire in a spiral formation about the cable and strand. The lashing wire must be secured at each point of termination, as for example, adjacent the supports or poles. Also, when a cable is cut or a splicing sleeve placed thereon or a terminal box placed in the cable which may be done at time of installation or in repair or other services on the cable, the lashing wire is anchored and then cut and additional supports applied to hold the cable, sleeve or the like to the strand or messenger. While metal straps have been wound about the cable and messenger, those heretofore used resulted in waste of material, abrasion or damage to the sheath on the cable and difficulties in installation.

The principal objects of the present invention are to provide an aerial cable support usable for securing one or more cables to a messenger to positively bind them together with the cable shielded against abrading action; to provide an aerial cable support particularly adapted for use on structures wherein the cables are lashed to the messenger or strand by a wire spirally wound therearound wherein said support is positioned adjacent the termination of the lashing wire and aids in holding same taut; to provide such a support which includes a buckle adapted to engage on a supporting strand and has strap end-receiving members wherein the strap is secured to the buckle, wound around the cable and strand under tension and its other end secured to the buckle to maintain said strap under tension; to provide such a structure with a resilient shield interposed between the cable and strap; to provide such a structure wherein the buckle and the shield have loop portions through which the strap extends to facilitate retaining the parts in assembled cable-supporting position; and to provide a cable support which is economical to manufacture, easily installed to efficiently support the cable to a messenger without danger of injury to the cable.

Other objects and advantages of this invention will become apparent from the following description taken in connection with the accompanying drawings wherein are set forth by way of illustration and example certain embodiments of this invention.

FIG. 1 is a perspective view of a cable lashed to a pole-supported messenger or strand and cable supports embodying the features of the present invention holding the cable to the strand at selected points.

FIG. 2 is an enlarged perspective view of a cable support assembled on cables and strand.

FIG. 3 is a perspective view of a cable support partially assembled on a cable and messenger strand with portions broken away to illustrate the structure of the buckle.

FIG. 4 is an enlarged transverse sectional view through the cable, strand and cable support.

FIG. 5 is a perspective view of the cable shield, particularly showing the bottom thereof.

Referring more in detail to the drawings:

1 designates a messenger or strand suitably mounted on a support such as a pole 2 by a clamp 3 whereby said messenger or strand extends between such supports or poles. One or more cables 4 extend along the messenger and are bound or supported therefrom by a lashing wire 5 which is applied spirally around the cable and messenger, the lashing wire 5 in the illustrated structure of FIG. 1 terminating at ends 6 and 7. In the structure illustrated, the cable 4 has a sleeve 8 thereon.

Cable supports 9 constructed in accordance with the present invention are applied to the cable and messenger at selected intervals which include positions adjacent the terminal ends of the lashing wire 5, as for example at lashing wire terminations such as 6 adjacent the support post 2; also at a position adjacent the termination 7 where the lashing wire 5 is cut for a sleeve 8 or the like and the termination is adjacent the ends of the sleeve. Supports 9 are also arranged as at 10 on the sleeve and the like to support same from the messenger strand 1. The messenger 1 is usually a wire rope or the like and the cables 4 may be of any conventional structure, as for example, a sheath 11 enclosing a plurality of circuit wires 12. The sheath 11 may be an insulating covering such as rubber, neoprene or the like, or lead or other suitable sheath making a waterproof covering for the circuit wires.

The cable support 9 generally includes a buckle 13, a cable shield 14, and a strap 15 arranged about the cables and strand in such a manner as to tightly bind the cables relative to the strand and yet protect the cables against any abrading action from the buckle or strap. The strap 15 is preferably a thin metal band that is formable whereby it may be easily bent with little or no spring-back. It has been found that thin aluminum or stainless steel is particularly adapted for this use and that while various widths may be used a ¾-inch width has been found suitable for the usual installation.

The buckle 13 is preferably formed of metal somewhat wider than the strap 15, and is bent on a transverse line 16 preferably substantially mid-way the ends 17 and 18 to form a generally inverted V with side portions or legs 19 and 20 diverging outwardly from the bend line 16 to the ends 17 and 18 respectively, said legs preferably being substantially planar and defining an obtuse angle. A transverse slot 21 is formed in the leg 20 adjacent to the end 18, said slot being slightly wider than the strap 15 whereby the strap may be extended through the slot. The buckle preferably has a loop portion 22 adjacent the end 17, said loop being upstanding from the leg 19 a distance sufficient to receive a plurality of thicknesses of the strap, as for example three or four thicknesses. While the loop portion may be secured to the leg in any suitable manner, it is preferable that the buckle be formed from a single sheet of metal and the loop be formed upwardly from the leg 19 whereby it has substantially parallel portions 23 extending from the leg 19 with outer ends connected by a bar 24, the spacing between the legs 23 preferably being substantially the same as the length of the slot 21 or, in other words, slightly wider than the strap whereby the strap can extend therethrough. The buckle is adapted to be placed on the messenger 1 with the messenger being at the apex of the V, and the legs 19 and 20 extending outwardly and downwardly therefrom. One end 25 of the strap 15 is inserted upwardly through the slot 21 and is then bent in a reverse bend as at 26 over the end 18. Then the strap is pulled around a cable and strand under tension and the buckle is held against movement in the direction of the winding of the strap by a tongue 27 which is struck downwardly from the leg 19 and spaced from the bend line 16 approximately one-half the diameter of the messenger or strand 1 whereby said tongue 27 engages a side of the messenger or strand 1.

It is preferred that the cable sheath 11 be protected against abrasion and the like and, therefore, the shield 14 is placed around the cable sheaths. The shield 14 is preferably formed of resilient cushioning material such as rubber, neoprene or the like, and is in the form of a strip of suitable length to extend around the cable or cables lashed to the messenger strand. It is preferred that the shield 14 have suitable width to extend beyond the side edges 28 of the buckle a suitable distance to avoid any possible contact of the edges of the buckle with the sheath of the cable. Also, it is preferred that a loop 29 be arranged mid-way the ends 30 of the shield strip 14, said loop extending transversely of the width of the shield and extending outwardly from the bottom face 31 thereof, said loop preferably consisting of outwardly extending, substantially parallel legs 32 connected by a bar 33 spaced from the face 31 of the shield strip a distance to receive a plurality of thicknesses of the strap 15, as for example three or four thicknesses. The spacing between the legs 32 of the loop is slightly greater than the width of the strap 15 whereby the strap can be easily placed therethrough.

In mounting a support structure constructed as described on a cable and messenger, a shield strip 14 is placed around the cable or cables and cut whereby its ends 30 substantially abut under the messenger or strand 1 with the loop 29 under the cable in vertical alignment with the messenger. Then, an end 25 of a strap 15 is inserted through the slot 21 and provided with a reverse bend as at 26 to overlie the upper face of the leg 20 and extend beyond the end 18, as illustrated in FIG. 4. The buckle is then placed whereby the bend line 16 is immediately over the strand 1 with the legs 19 and 20 extending outwardly and downwardly therefrom. In this position, the tongue 27 engages a side of the messenger strand oppositely from the portion of the strap extending through the slot 21. Then, while the buckle is held in position, the strap is pulled around in overlying relation to the shield strip, the strap end 34 inserted through the loop 29, and then moved around and inserted through the loop 22, said strap being pulled tight and repeated wraps being applied with each wrap extending through the loop 29 and the loop 22. When a suitable number of wraps, as for example three, have been substantially completed, the end 34 of the strap is inserted through the loop 22, pulled tight and then provided with a reverse outward bend as at 35 back over the bar 24 and the adjacent portion of the strap, as illustrated in FIG. 4. This provides a tight supporting bond between the cables and the messenger strand and there is some friction between the shield and cable sheath and the strap and shield whereby the structure is substantially held against movement longitudinally of the messenger or strand. When the support is placed around the cable and strand at a temination of the lashing wire 5, the lashing wire extends across the support and is wound around the strand and a clamp 36 placed on the lashing wire at a portion adjacent where the lashing wire extends under the strand so that the lashing wire is held taut.

The strap 15 preferably comes in roll form and any desired length may be cut therefrom for use in wrapping around the cable and strand to provide the number of wraps desired and also to accommodate different numbers of cables, as well as different size cables, sleeves and the like. With this arangement, a minimum amount of the strapping will be used as there is no need to cut excessive lengths. It is preferred that the buckle be of material that can be bent with some force whereby the legs 19 and 20 may be bent by an operator to extend from the strand outwardly and have slight spacing as at 37 from the shield 14, as illustrated in FIG. 4. Therefore, the same buckle may be utilized on each installation regardless of the number of cables to be supported, as for example it is adaptable for one cable or a plurality of cables, as for example two, three or four as may be desired.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In combination, an aerial cable, a supporting strand, a cable support securing said aerial cable to said supporting strand, said cable support comprising, a buckle having a transverse bend resting in overlying relation on said strand and having diverging side portions extending laterally of said strand with said side portions terminating in end edges, an upstanding loop member on said one side portion adjacent the end edge thereof, said loop being transversely of said buckle, a flat bendable strap having one end anchored to the other side portion of said buckle, said strap extending around a cable and upwardly through said loop then over the buckle in a plurality of turns, the other end of the strap extending through the loop and reversely bent thereover forming an anchor thereof to said buckle, and means on said buckle engaging a side of the strand to hold the buckle against lateral movement relative to said strand.

2. In combination, an aerial cable, a supporting strand, a cable support securing said aerial cable to said supporting strand comprising, a buckle having a transverse bend resting in overlying relation on said strand and having diverging side portions extending laterally of said strand with said sides terminating in end edges, an upstanding loop member on one side portion, an elongate slot in the other side adjacent the end edge thereof, said slot and loop each being transversely of said buckle, a flat bendable strap having one end extending through said slot and reversely bent to anchor said one end to said other side portion of said buckle, said strap extending around under a cable and upwardly through said loop then over the buckle in a plurality of turns, the other end of the strap extending through the loop and reversely bent thereover forming an anchor thereof to said buckle, and means integral with said buckle and depending therefrom and engaging a side of the strand to hold the buckle against lateral movement relative to said strand in response to tension of said strap.

3. In combination, an aerial cable, a supporting strand, a cable support securing said aerial cable to said supporting strand, said cable support comprising, a buckle having a transverse bend resting in overlying relation on said strand and having diverging side portions extending laterally of said strand with said side portions terminating in end edges, a tongue on one of said side portions engaging a side of the strand, an upstanding loop member on said one side portion spaced outwardly from said tongue, an elongate slot in the other side portion adjacent the end edge thereof, said slot and loop each being transversely of said buckle, and a flat bendable strap having one end extending through said slot and reversely bent to anchor said one end to said other side portion of said buckle, said strap extending around a cable and upwardly through said loop then over the buckle in a plurality of turns, the other end of the strap extending through the loop and reversely bent thereover forming an anchor thereof to said buckle.

4. In combination, an aerial cable, a supporting strand, a cable support securing said aerial cable to said supporting strand, said cable support comprising, a buckle having a transverse bend resting in overlying relation to said strand and having diverging side portions extending laterally of said strand, said side portions terminating in end edges, an upstanding loop member on one side portion, said loop being transversely of said buckle, a shield strip of flexible yieldable material and of greater width than the buckle having a mid-portion under the cable with ends extending around the cable and terminating between the cable and strands supporting same, and a flat bendable strap having one end secured to the other side portion of said buckle, said strap extending downwardly around the cable exteriorly of said shield strip then upwardly and through the loop on the buckle then over the buckle in a plurality of turns, the other end of the strap extending through the loop on the buckle and reversely bent thereover forming an anchor thereof to said buckle.

5. A cable, strand and cable support as set forth in claim 4 including, means on said buckle engaging a side of the strand to hold the buckle against lateral movement relative to said strand.

6. In combination, an aerial cable, a supporting strand, a cable support securing said aerial cable to said supporting strand, said cable support comprising, a buckle having a transverse bend resting in overlying relation to said strand and having diverging side portions extending laterally of said strand, said side portions terminating in end edges, an upstanding loop member on one side portion, an elongate slot in the other side portion adjacent the end edge thereof, said slot and loop each being transversely of said buckle, a shield strip of flexible yieldable material and of greater width than the buckle having a mid-portion under the cable with ends extending around the cable and terminating between the cable and strands supporting same, and a flat bendable strap having one end extending through said slot and reversely bent to anchor said one end to said other side portion of said buckle, said strap extending downwardly around the cable exteriorly of said shield strip then upwardly and through the loop on the buckle then over the buckle in a plurality of turns, the other end of the strap extending through the loop on the buckle and reversely bent thereover forming an anchor thereof to said buckle.

7. A cable, strand and cable support as set forth in claim 6 including, a loop mounted on and extending downwardly from said shield strip below the cable with said strap extending through said shield loop.

8. In combination, an aerial cable, a supporting strand, a cable support securing said aerial cable to said supporting strand, said cable support comprising, a buckle having a transverse bend resting in overlying relation to said strand and having diverging side portions extending laterally of said strand, said side portions terminating in end edges, a tongue on one of said side portions and depending therefrom and engaging a side of the strand, an upstanding loop member on said one side portion adjacent the end edge thereof, an elongate slot in the other side portion adjacent the end edge thereof, said slot and loop each being transversely of said buckle, a shield strip of flexible yieldable material and of greater width than the buckle having a midportion under the cable with ends extending around the cable and terminating between the cable and strand supporting same, a transversely arranged loop on said shield strip at the mid-portion and oppositely disposed thereon from said cable, and a flat bendable strap having one end extending through said slot and reversely bent to anchor said one end to said other side portion of said buckle, said strap mounted on and extending downwardly from said shield around the cable exteriorly of said shield strip through the loop thereon then upwardly and through the loop on the buckle then over the buckle in a plurality of turns, the other end of the strap extending through the loop on the buckle and reversely bent thereover forming an anchor thereof to said buckle.

References Cited by the Examiner
UNITED STATES PATENTS

| | | | |
|---|---|---|---|
| 1,301,102 | 4/19 | Cary | 24—23 |
| 1,352,549 | 9/20 | Sinclair | 248—61 |
| 1,652,813 | 12/27 | Cary | 24—23 |
| 1,719,823 | 7/29 | Eklof | 24—22 X |
| 2,417,244 | 3/47 | Eggert et al. | 248—61 |
| 2,438,362 | 3/48 | Dunkelberger et al. | 248—74 X |
| 2,595,857 | 5/52 | Kinsel | 248—61 |
| 2,651,484 | 9/53 | Marchetti | 248—61 |
| 2,956,311 | 10/60 | Raydt et al. | 174—41 X |

CLAUDE A. LE ROY, *Primary Examiner.*